(12) United States Patent
Childs et al.

(10) Patent No.: US 11,793,114 B2
(45) Date of Patent: Oct. 24, 2023

(54) AGRICULTURAL VEHICLE INCLUDING A PICKUP WITH A TINE GUIDE

(71) Applicant: CNH Industrial America LLC, New Holland, PA (US)

(72) Inventors: Albert Childs, Denver, PA (US); Enrico Giuliani, Russi (IT)

(73) Assignee: CNH Industrial America LLC, New Holland, PA (US)

( * ) Notice: Subject to any disclaimer, the term of this patent is extended or adjusted under 35 U.S.C. 154(b) by 189 days.

(21) Appl. No.: 17/209,687

(22) Filed: Mar. 23, 2021

(65) Prior Publication Data

US 2022/0304238 A1 Sep. 29, 2022

(51) Int. Cl.
| | | |
|---|---|---|
| *A01D 89/00* | (2006.01) | |
| *A01D 80/02* | (2006.01) | |
| *A01F 15/10* | (2006.01) | |

(52) U.S. Cl.
CPC ........... *A01D 89/002* (2013.01); *A01D 80/02* (2013.01); *A01D 89/006* (2013.01); *A01F 15/10* (2013.01)

(58) Field of Classification Search
CPC .... A01D 89/00–89/008; A01D 87/00–87/127; A01D 78/00–78/20; A01D 57/00–57/30; A01F 15/00–15/18
See application file for complete search history.

(56) References Cited

U.S. PATENT DOCUMENTS

| | | | |
|---|---|---|---|
| 4,297,833 A * | 11/1981 | Gaeddert | A01D 89/002 56/364 |
| 7,516,604 B2 | 4/2009 | Josset | |
| 8,181,435 B1 | 5/2012 | McClure et al. | |
| 10,225,985 B2 | 3/2019 | Cox et al. | |
| 2006/0242937 A1 | 11/2006 | Pourchet et al. | |
| 2007/0107402 A1 | 5/2007 | McClure et al. | |
| 2012/0304612 A1 | 12/2012 | Roberge | |
| 2021/0161072 A1* | 6/2021 | Speich | A01D 78/02 |

FOREIGN PATENT DOCUMENTS

| | | |
|---|---|---|
| DE | 6919313 U | 11/1969 |
| DE | 102016009007 A1 | 2/2018 |

OTHER PUBLICATIONS

Extended European Search Report for EP application 22163352.2, dated Aug. 4, 2022 (6 pages).

* cited by examiner

*Primary Examiner* — Thomas B Will
*Assistant Examiner* — Madeline I Runco
(74) *Attorney, Agent, or Firm* — Peter K. Zacharias (57) ABSTRACT

A pickup for an agricultural vehicle includes: a rotatable tine carrier; a plurality of tines rotatably carried by the tine carrier through a rotation path; a pickup band assembly including a plurality of tine slots in which the tines are disposed in a position in the rotation path; and a tine guide having at least one guide slot. The tine guide is rotatable with at least one of the tines such that the at least one tine is disposed in the at least one guide slot in a position in the rotation path in which the at least one tine is outside any of the tine slots of the pickup band assembly.

18 Claims, 11 Drawing Sheets

AGRICULTURAL VEHICLE INCLUDING A PICKUP WITH A TINE GUIDE

FIELD OF THE INVENTION

The present invention pertains to agricultural vehicles and, more specifically, to a pickup for an agricultural vehicle.

BACKGROUND OF THE INVENTION

Agricultural vehicles, such as balers, may be used to consolidate and package crop material so as to facilitate the storage and handling of the crop material for later use. In the case of hay and forage, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit, which also may be referred to as a "pickup," at the front of the baler gathers the cut and windrowed crop material from the ground. The pickup unit includes a pickup roll, and optionally may include other components such as side shields, stub augers, wind guard, etc. In other agricultural vehicles, the pickup generally functions similarly, i.e., gathers cut crop material from the ground and conveys the gathered crop material to another element of the agricultural vehicle.

A packer unit is used to move the crop material from the pickup unit to a feeding channel (also known as a "pre-compression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically such a packer unit includes packer tines or forks to move the crop material from the pickup unit into the feeding channel. Instead of a packer unit it is also known to use a rotor cutter unit which chops the crop material into smaller pieces.

A stuffer unit transfers the wad of crop material in charges from the feeding channel to the main bale chamber. Typically such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Known pickup units generally use flexible tines to feed crop material from the ground to other components of the agricultural vehicle, such as the packer unit or other type of feeder unit. The tines rotate through slots of a guide, which

2 may be in the form of a band, for support during rotation so the tines do not excessively deflect during operation. In some instances, the flexible tines do not have sufficient support to prevent the tines deflecting out of their intended path and crossing over into the path of one or more other tines. One or more of the tines crossing over is damaging to parts of the pickup unit, reduces pickup performance, and introduces downtime to correct or replace damaged parts.

What is needed in the art is a pickup that addresses some of the issues associated with known pickups.

SUMMARY OF THE INVENTION

Exemplary embodiments provided according to the present disclosure include a tine guide with one or more guide slots in which one or more tines can be disposed when the tine(s) is outside of any tine slots of a pickup band assembly.

In some exemplary embodiments provided according to the present disclosure, a pickup for an agricultural vehicle includes: a rotatable tine carrier; a plurality of tines rotatably carried by the tine carrier through a rotation path; a pickup band assembly comprising a plurality of tine slots in which the tines are disposed in a position in the rotation path; and a tine guide having at least one guide slot. The tine guide is rotatable with at least one of the tines such that the at least one tine is disposed in the at least one guide slot in a position in the rotation path in which the at least one tine is outside any of the tine slots of the pickup band assembly.

In some exemplary embodiments provided according to the present disclosure, an agricultural vehicle includes a chassis and a pickup carried by the chassis. The pickup includes: a rotatable tine carrier; a plurality of tines rotatably carried by the tine carrier through a rotation path; a pickup band assembly comprising a plurality of tine slots in which the tines are disposed in a position in the rotation path; and a tine guide having at least one guide slot. The tine guide is rotatable with at least one of the tines such that the at least one tine is disposed in the at least one guide slot in a position in the rotation path in which the at least one tine is outside any of the tine slots of the pickup band assembly.

A possible advantage that may be realized by exemplary embodiments provided according to the present disclosure is that the tines can be supported in a larger range of the rotation path, reducing the risk of the tines overly deflecting and crossing over.

Another possible advantage that may be realized by exemplary embodiments provided according to the present disclosure is that the tine guide can be adapted to a wide variety of pickup configurations to support the tines.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
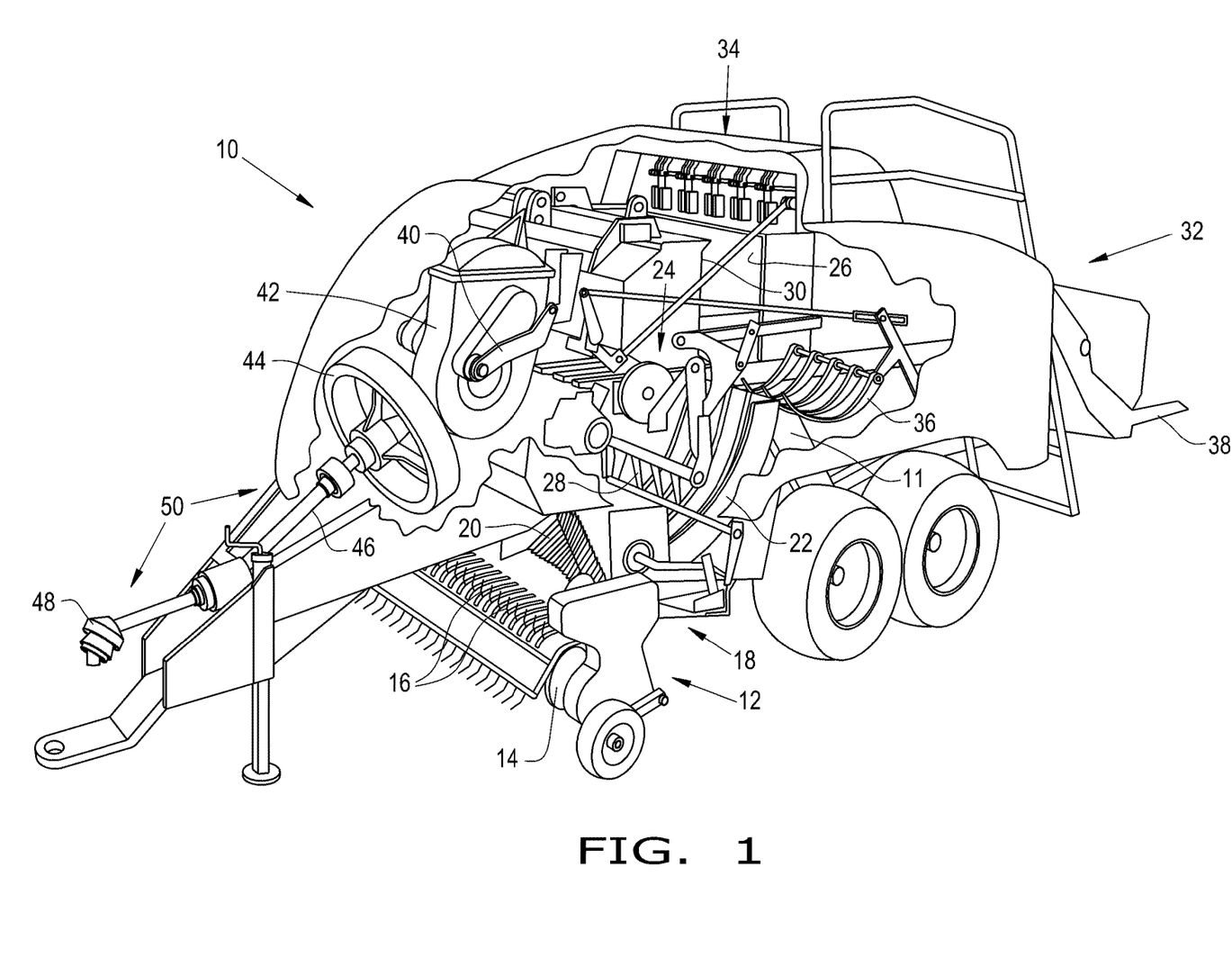
FIG. 1 illustrates a perspective cutaway view of the internal workings of an exemplary embodiment of an agricultural vehicle in the form of an agricultural baler, the agricultural baler comprising a chassis and a pickup, in accordance with an exemplary embodiment of the present invention.

Referring now to the drawings, and more particularly to FIG. 1, there is shown a perspective cutaway view showing the internal workings of an exemplary embodiment of an agricultural vehicle, shown in the form of a large square baler 10, provided according to the present disclosure. It should be appreciated that while the agricultural vehicle 10 is illustrated and described herein as a large square baler, the agricultural vehicle 10 may be provided as a variety of different vehicles that incorporate a pickup, including but not limited to a round baler, a small square baler, a forage harvester, a forage merger, a crop merger, or a self-loading forage wagon. Baler 10 includes a chassis 11 carrying a number of baler components (described below) and operates on a two stage feeding system. Crop material is lifted from windrows into the baler 10 using a pickup 12. The pickup 12 includes a reel 14 with tines 16 which move the crop rearward toward a packer unit 18, which may be generically referred to as a "feeder unit." An optional pair of stub augers (one of which is shown, but not numbered) are positioned above the reel 14 to move the crop material laterally inward. The packer unit 18 includes packer tines 20 which push the crop into a feeding channel 22 to form a wad of crop material. The packer tines 20 intertwine the crop together and pack the crop within the feeding channel 22. Feeding channel 22 and packer tines 20 function as the first stage for crop compression. Once the pressure in the feeding channel 22 reaches a predetermined sensed value, a stuffer unit 24 moves the wad of crop from the feeding channel 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

In known pickups, the tines, which are generally quite flexible, may be supported in slots formed between pickup bands as they carry crop material. The tines traveling through the slots formed between the pickup bands can reduce the risk of excessive side-to-side deflection of the tines while also acting as a guide for the crop as it is carried from the ground to the feeder unit. The pickup bands can also protect the reel components from damage by obstacles, such as rocks; act as a guide for crop to be carried from the ground to the feeder unit by the tines; and act as a barrier between the crop and the reel mechanism to reduce the risk of crop wrapping around the reel. While the pickup bands are effective at supporting the tines, the tines generally travel outside of the slots formed between the pickup bands during a part of their rotation as they return to a front position in order to engage and carry more crop material. While the tines are outside of slots formed between the pickup bands, the tines are less supported and more prone to excessive deflection and crossing over.

To address some of the previously described issues with known pickups, and referring now to FIGS. 2-11, an exemplary embodiment of the pickup 12 provided according to the present disclosure includes one or more rotatable tine carriers 210 that rotatably carry a plurality of tines, designated as tines 16A and 16B in FIGS. 2-11, through a rotation path RP, a pickup band assembly having a plurality of tine slots 221 in which the tines 16A, 16B are disposed in a position in the rotation path RP, and a tine guide 230 that has at least one guide slot 231 and is rotatable with at least one of the tines 16A, 16B. It should be appreciated that while one tine carrier 210 is illustrated in FIGS. 2-11, the pickup 12 may include a plurality of tine carriers 210 to carry the tines 16 of the pickup 12. Further, the tine carriers 210 may collectively form the reel 14 of the pickup 12 or, alternatively, be rotated by the reel 14, such as by a reel shaft 17 of the reel 14, to rotate the tines 16. It should also be appreciated that while the tine carrier 210 is illustrated in the shape of a disc, which may be known as a "reel disc," the tine carrier(s) 210 may be formed to have other shapes and configurations, such as a "reel spider" that includes a series of arms and links mounted to a reel shaft to carry the tines. As can be appreciated from FIGS. 2-11, the tine guide 230 is rotatable with one or more of the tines 16A, 16B such that the at least one tine 16A, 16B is disposed in the at least one guide slot 231 in a position in the rotation path RP in which the at least one tine 16A, 16B is outside any of the tine slots 221 formed between the pickup bands 220. In this respect, the tine guide 230 can support the tines 16A, 16B and reduce the risk of excessive deflection of the tines 16A, 16B when the tines 16A, 16B are outside any of the tine slots 221 formed between the pickup bands 220 and thus unsupported by the pickup bands 220.

As illustrated, the pickup band assembly 220 may have a shape that generally follows an arc, but is not a full circle, so the tines 16A, 16B rotate within tine slots 221 in various positions in the rotation path RP, but not through an entirety of the rotation path RP. In some embodiments, the pickup band assembly 220 includes a plurality of pickup bands 222 that are coupled together to form the tine slots 221 between the pickup bands 222. It should be appreciated that the pickup band assembly 220 may be formed as a single pickup band that has the tine slots 221 formed therein. In some embodiments, the tine slots 221 define a varying slot width SW, allowing for variable amounts of side-to-side deflection of the tines 16A, 16B while disposed within the tine slots 221. It should be appreciated that while each of the tines 16A, 16B are illustrated in FIGS. 2-5 and 7-11 as being disposed in a respective one of the tine slots 221 and each of the tine slots 221 only has one tine 16A, 16B disposed therein, multiple tines 16, 16A, 16B may be disposed in each of the tine slots 221 simultaneously according to the present disclosure, as is known.

Figure 6:
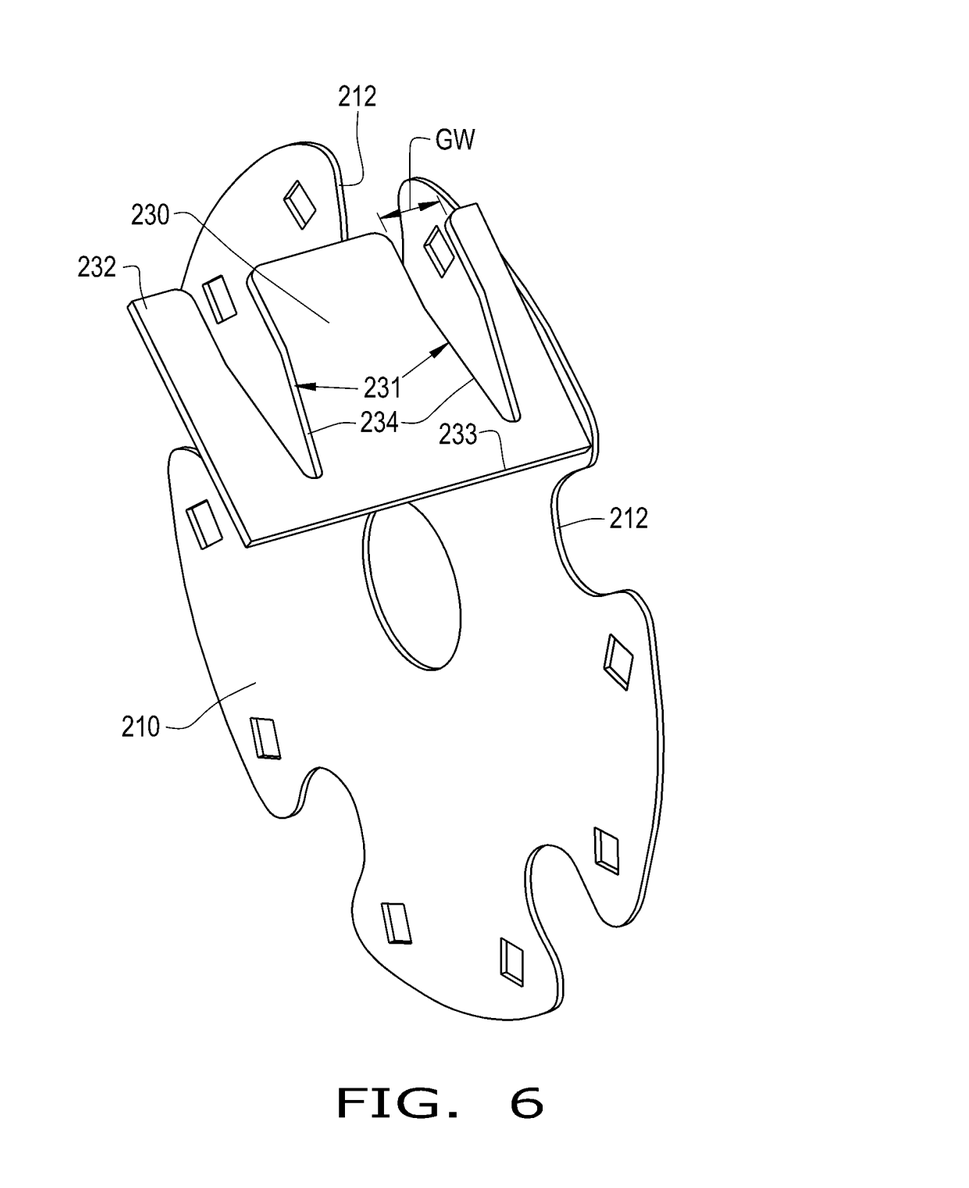
FIG. 6 illustrates a perspective view of the tine guide of the pickup of the baler of FIGS. 1-5 coupled to a tine carrier that rotates to carry the tines and the tine guide, in accordance with an exemplary embodiment of the present invention.

The tine guide 230, which is illustrated in greater detail in FIG. 6, may be provided in the form of a rectangular plate with the guide slots 231 formed therein. It should be appreciated that while the tine guide 230 is illustrated as a rectangular plate, the tine guide 230 may be provided with other shapes, e.g., square or circular, and does not need to be a plate. In some embodiments, the tine guide 230 is carried by the tine carrier 210 that carries the tines 16A, 16B, which allows the tine guide 230 to rotate with the tines 16A, 16B at the same rotational velocity as the reel 14. The tine guide 230 may, for example, be welded or otherwise rigidly connected to the tine carrier 210. It should be appreciated that the tine guide 230 does not need to be carried by the tine carrier 210, and may be carried or otherwise rotatable with the tines 16A, 16B in a variety of different other ways. In some embodiments, the guide slots 231 formed in the tine guide 230 may have a variable guide slot width GW that is greatest adjacent to an edge 232 in which the guide slots 231 are formed and decreases in at least a portion of the guide slots 231 as the guide slots 231 approach an opposite edge 233. As illustrated in FIG. 6, the guide slot width GW may be relatively constant adjacent to the edge 232 before decreasing in a linear fashion toward the edge 233 to form a tapered section 234 of the guide slots 231. The guide slot width GW may be at least equal to the slot width SW and at least equal to a diameter of the tines 16, 16A, 16B.

Figure 2:
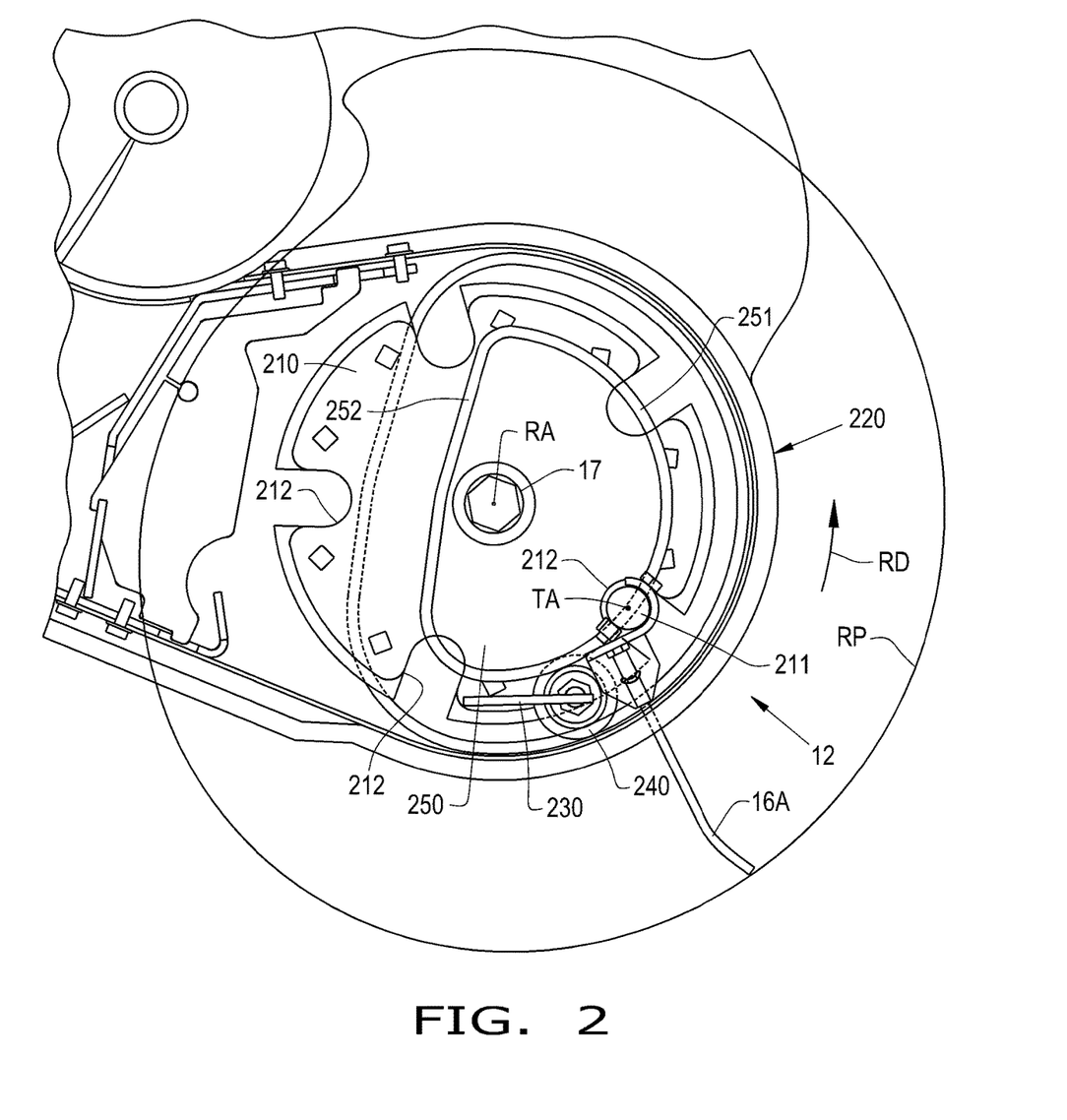
FIG. 2 illustrates a side view of the pickup of the baler of FIG. 1 with tines in a first position in their rotation path where the tine is disposed in a tine slot formed in a pickup band assembly between pickup bands, in accordance with an exemplary embodiment of the present invention.
Figure 7:
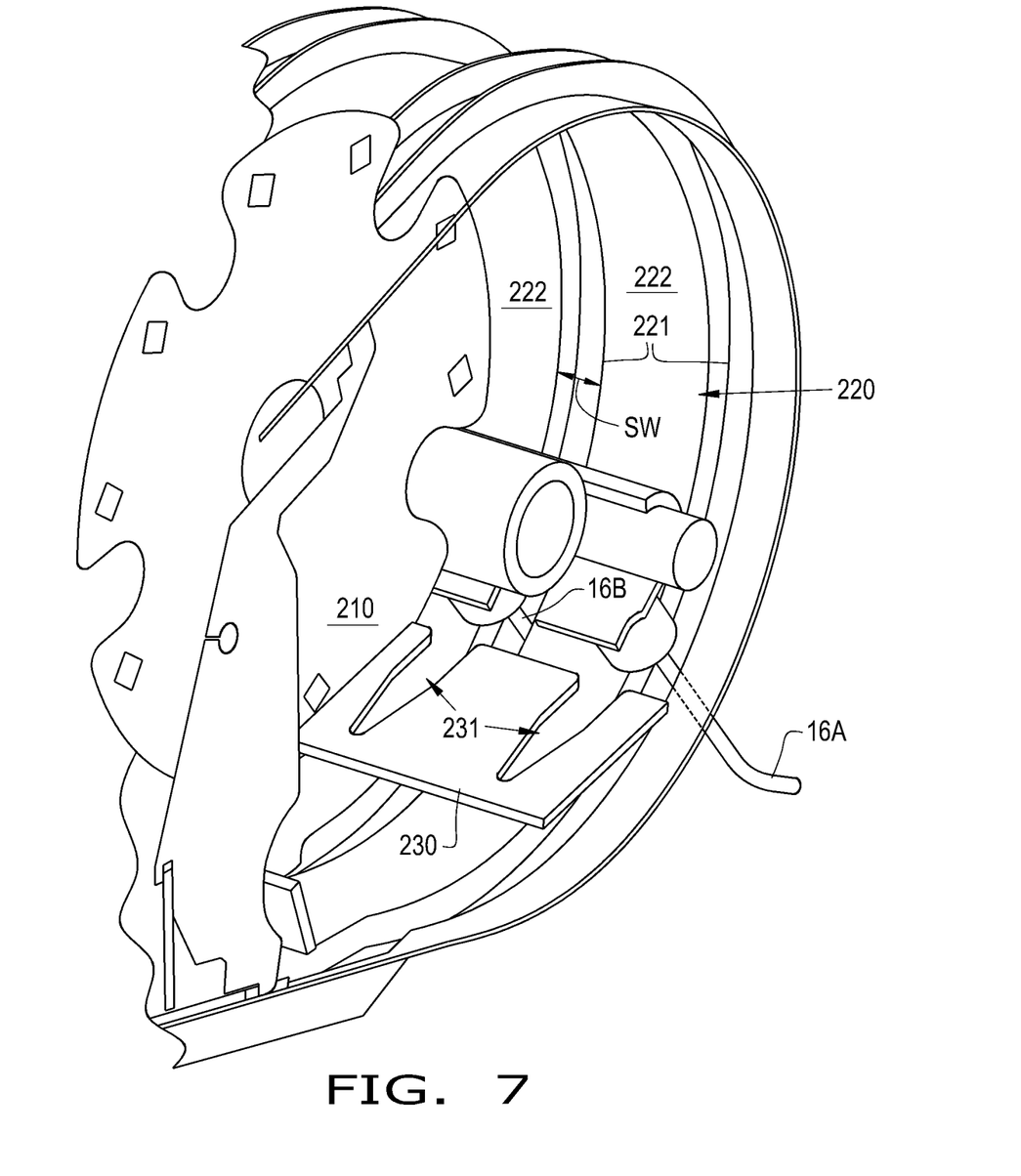
FIG. 7 illustrates a close-up perspective view of the pickup of the baler of FIGS. 1-5 when the tines are in the first position in their rotation path.

Referring specifically now to FIGS. 2 and 7, the tines 16A, 16B are illustrated in a first position in the rotation path RP where the tines 16A, 16B are each disposed in a respective one of the tine slots 221. In the first position, each of the tines 16A, 16B is supported against excessive deflection by the pickup band assembly 220. In some embodiments, the tines 16A, 16B are disposed outside of the guide slots 231 of the tine guide 230 while the tines 16A, 16B are in the first position (and/or one or more other positions) in which the tines 16A, 16B are disposed in a tine slot 221 formed in the pickup band assembly 220 between the pickup bands 222. In some embodiments, the tines 16A, 16B are disposed outside of the guide slots 231, i.e., not supported by the tine guide 230, while the tines 16A, 16B are disposed in the tine slots 221 of the pickup band assembly 220.

In some embodiments, the tines 16A, 16B are coupled to the tine carrier 210 by at least one tine bar, illustrated as a single tine bar 211. The tines 16A, 16B may be coupled to the tine bar 211, for example, by bolting the tines 16A, 16B to the tine bar 211. The tine bar 211 may be cylindrical, as illustrated, and disposed within a bar slot 212 formed in the tine carrier 210. The tine bar 211 may be carried in the bar slot 212 of the tine carrier 210 so the tine bar 211, and thus the coupled tines 16A, 16B, is pivotable within the bar slot 212 of the tine carrier 210 as the tines 16A, 16B are carried through the rotation path RP, as described further herein.

In some embodiments, the pickup 12 includes a follower 240 that is coupled to the tine bar 211 and a cam 250. The follower 240 is configured to move along the cam 250 to cause pivoting of the tines 16A, 16B. The cam 250 may have, but does not necessarily need to have, a first cam surface 251, which may be a curved surface, and a second cam surface 252, which may be a flat surface. The follower 240 may be configured to move along the first cam surface 251 and the second cam surface 252 during rotation of the reel 14, which causes rotation and pivoting of the tines 16A, 16B.

Figure 3:
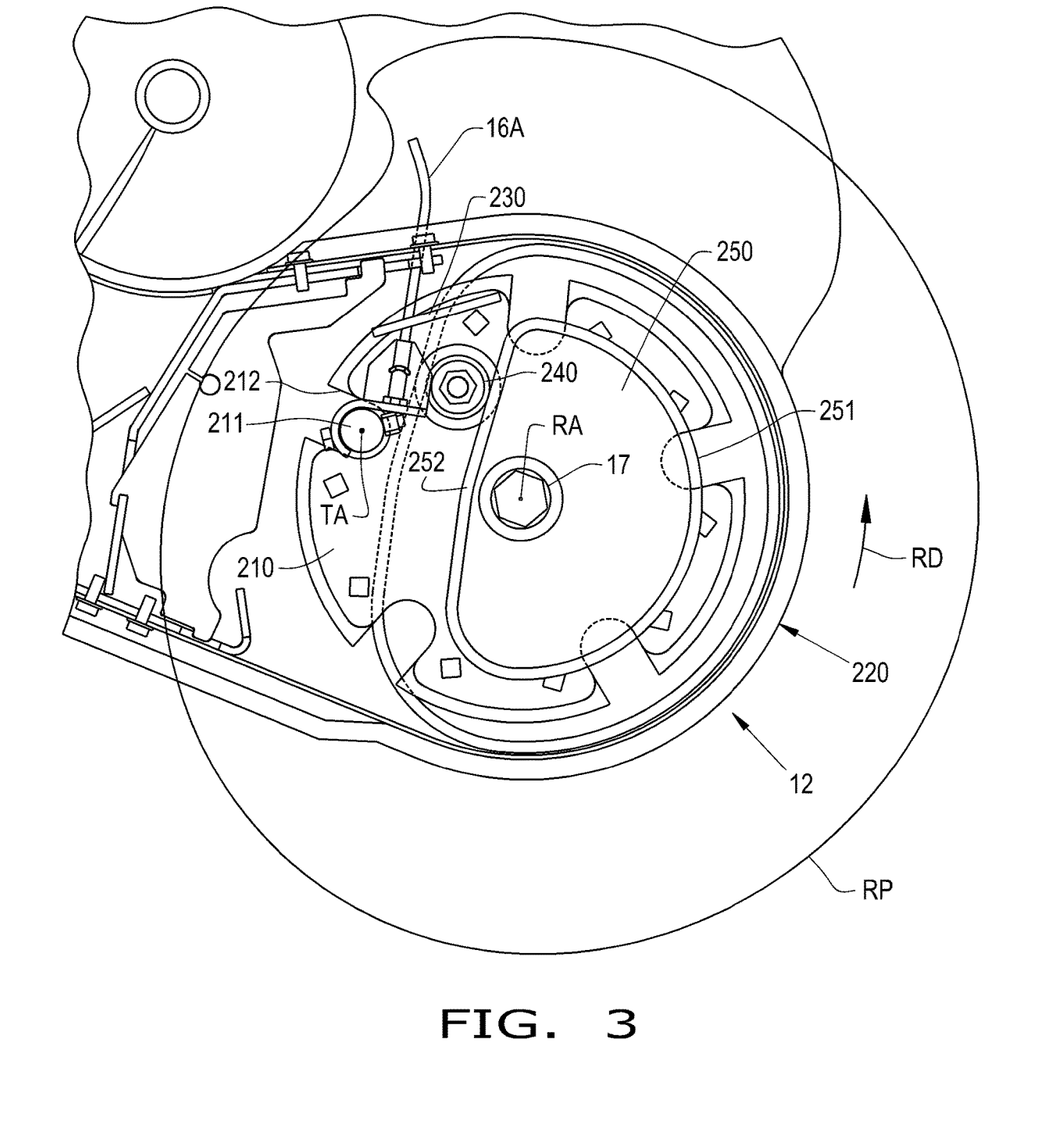
FIG. 3 illustrates a side view of the pickup of the baler of FIGS. 1-2 with the tines in a second position in their rotation path where the tines are disposed in guide slots of a tine guide and also disposed in a tine slot formed between pickup bands of the pickup band assembly, in accordance with an exemplary embodiment of the present invention.
Figure 8:
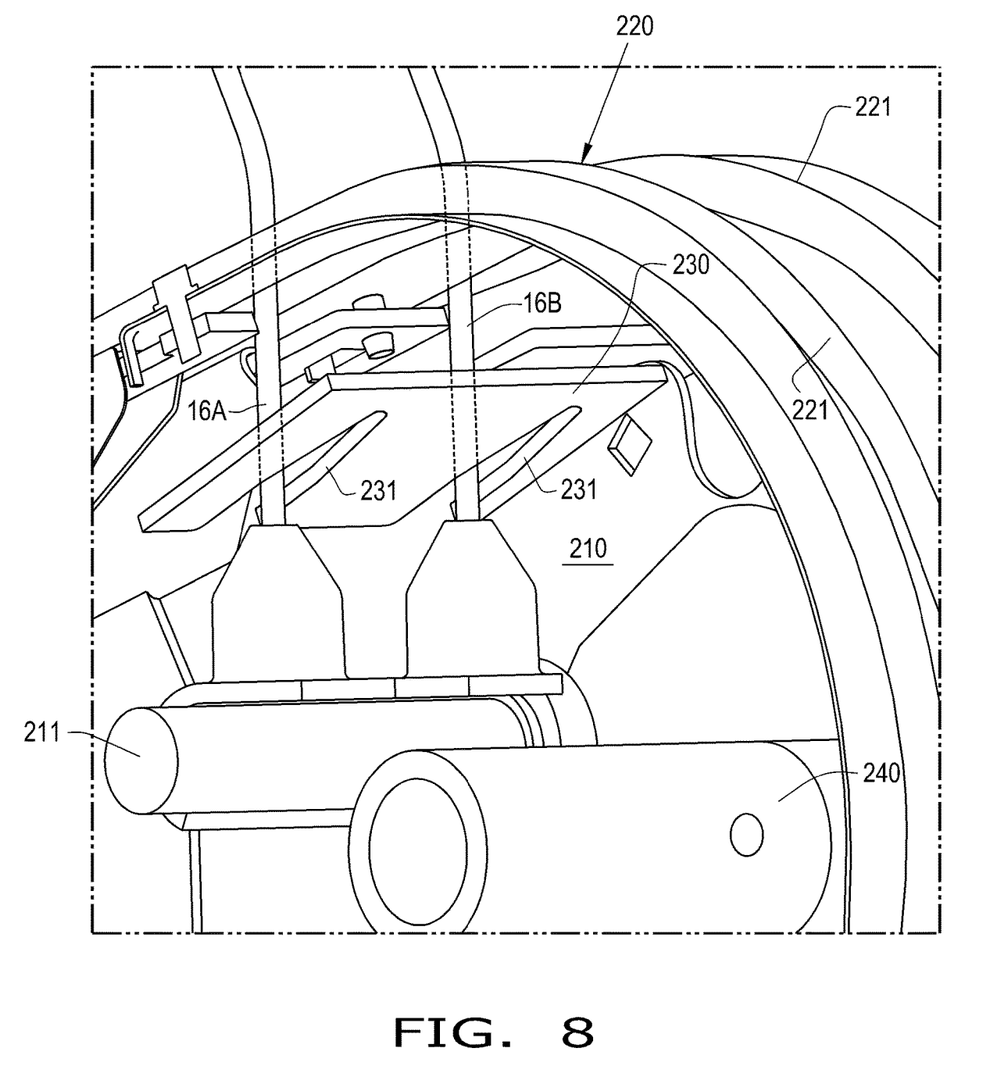
FIG. 8 illustrates a close-up perspective view of the pickup of the baler of FIGS. 1-5 and 7 when the tines are in the second position in their rotation path.

Referring specifically now to FIGS. 3 and 8, the pickup 12 is shown after the tines 16A, 16B have been rotated to a second position in the rotation path RP by the tine carrier 210 and are disposed in the guide slots 231 of the tine guide 230. As can be appreciated from comparing FIGS. 3 and 8 to FIGS. 2 and 7, the tine guide 230 may follow the tines 16A, 16B in a rotation direction RD of the tines 16A, 16B during rotation of the tines 16A, 16B and the follower 240 moves along the second cam surface 252 when the tines 16A, 16B are in the second position in the rotation path RP. As the follower 240 transitions from moving along the first cam surface 251 to moving along the second cam surface 252, the follower 240 causes the tine bar 211, and thus the coupled tines 16A, 16B, to pivot about a tine bar axis TA so the tines 16A, 16B pivot into the guide slots 231 of the tine guide 230, i.e., so the tines 16A, 16B are disposed in the guide slots 231. As illustrated, the tines 16A, 16B may still be in the tine slots 221 of the pickup band assembly 220 in the second position (and/or another position) as the tines 16A, 16B pivot to be disposed within the guide slots 231 of the tine guide 230. In some embodiments, the tines 16A, 16B are disposed in the tine slots 221 as the follower 240 moves along the first cam surface 251 and are disposed in the guide slots 231 as the follower 240 moves along the second cam surface 252. It should be appreciated that the tines 16A, 16B may also be disposed in the tine slots 221 as the follower 240 moves along a section of the second cam surface 252.

Figure 4:
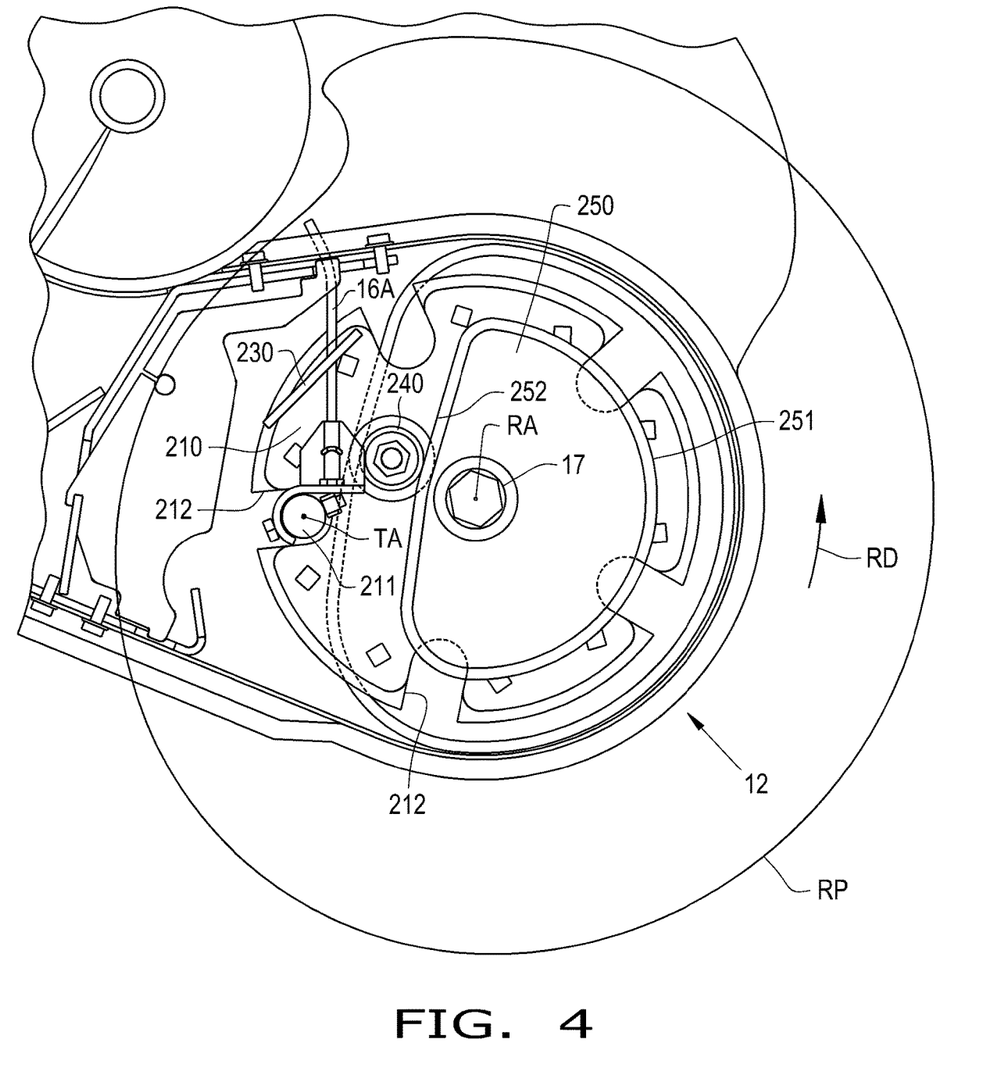
FIG. 4 illustrates a side view of the pickup of the baler of FIGS. 1-3 with the tines in a third position in their rotation path where the tines are disposed further in the guide slots of the tine guide, in accordance with an exemplary embodiment of the present invention.
Figure 9:
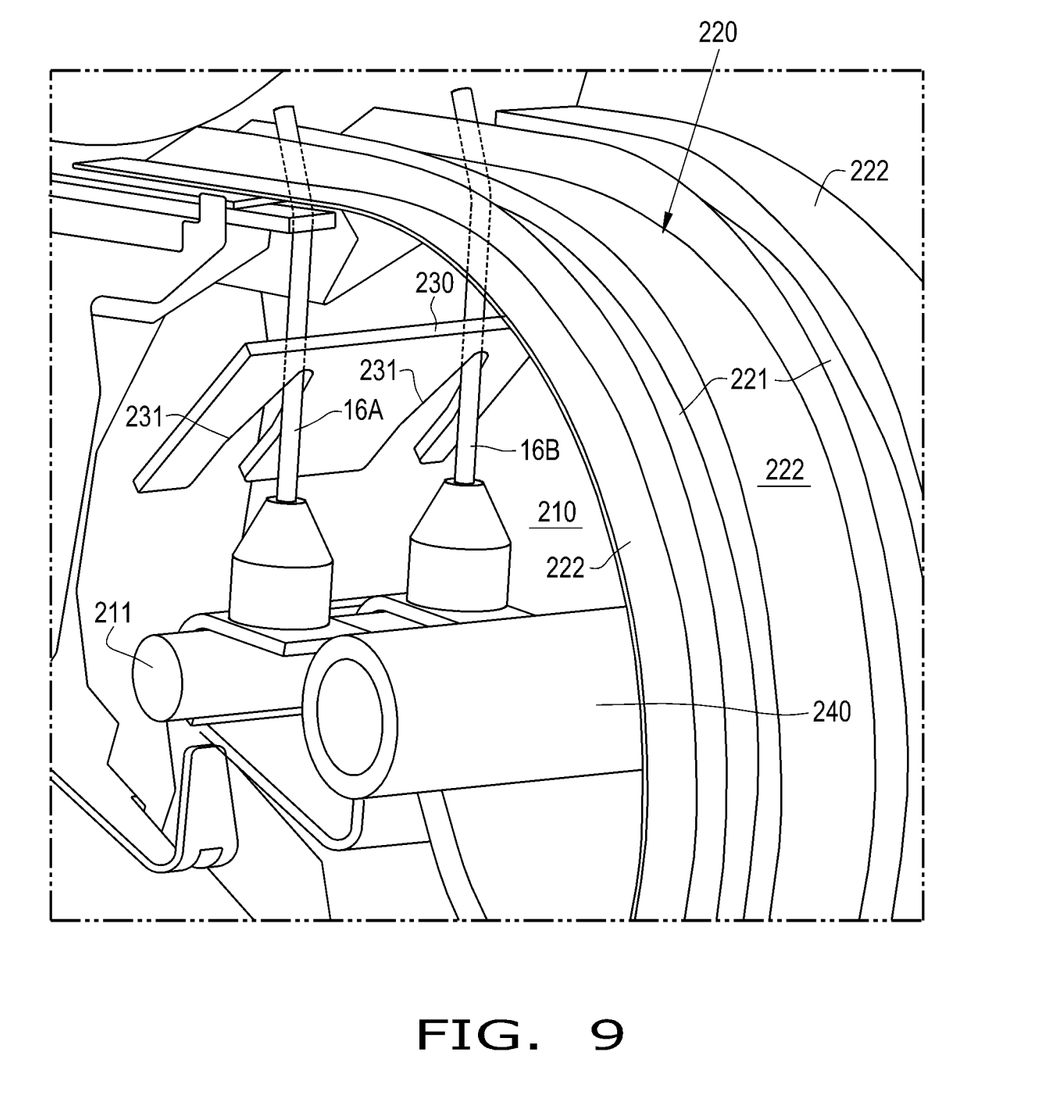
FIG. 9 illustrates a close-up perspective view of the pickup of the baler of FIGS. 1-5 and 7-8 when the tines are in the third position in their rotation path.

Referring specifically now to FIGS. 4 and 9, the pickup 12 is shown after the tines 16A, 16B have been rotated to a third position in the rotation path RP by the tine carrier 210 and are disposed further in the guide slots 231 of the tine guide 230 so the tines 16A, 16B are disposed in the tapered section 234 of the guide slots 231. As can be appreciated from FIGS. 4 and 9, the follower 240 has advanced further along the second cam surface 252 and cause pivoting of the tines 16A, 16B relative to the tine guide 230 so the tines 16A, 16B move further into the guide slots 231. Due to the guide slots 231 having a smaller guide slot width GW in the tapered section 234, the tines 16A, 16B are less free to deflect side-to-side while disposed in the tapered section 234, which better supports the tines 16A, 16B when the tines 16A, 16B are disposed outside of the tine slots 221 (illustrated in FIG. 10).

Figure 10:
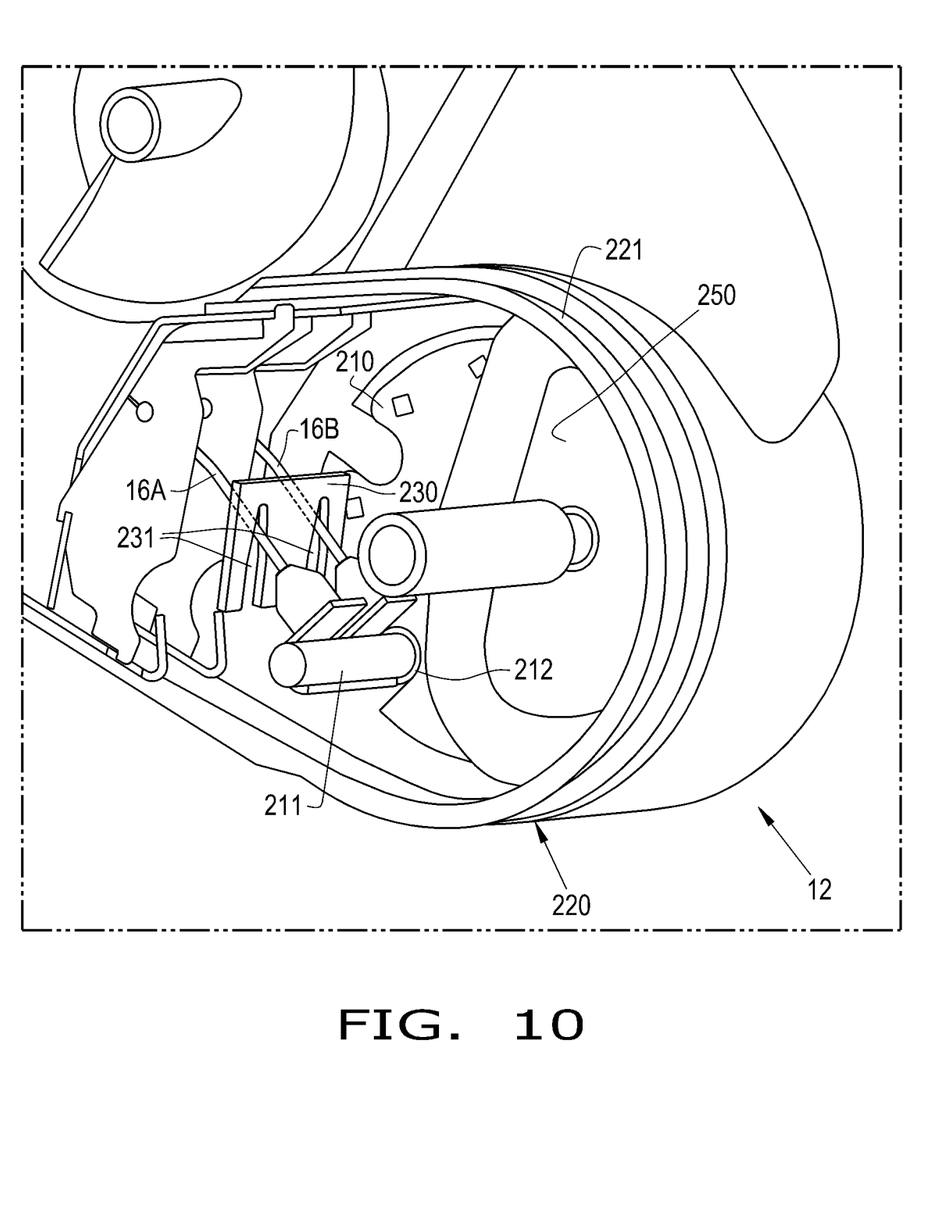
FIG. 10 illustrates a close-up perspective view of the pickup of the baler of FIGS. 1-5 and 7-9 when the tines are in a fourth position in their rotation path and are outside of any tine slots of the pickup band assembly.

Referring now to FIG. 10, the pickup 12 is shown after the tines 16A, 16B have been rotated to a fourth position in the rotation path RP by the tine carrier 210 and are disposed in the guide slots 231 of the tine guide 230 but are outside any of the tine slots 221 of the pickup band assembly 220. In the fourth position, the tines 16A, 16B are no longer supported against deflection by the pickup band assembly 220 and are instead supported against deflection in the guide slots 231 of the tine guide 230. In this respect, the tines 16A, 16B have pivoted into the tine guide 230, which may rotate with the tines 16A, 16B by coupling to the tine carrier 210, in the fourth position and rotated out of the tine slots 221 of the pickup band assembly 220. The pivoting of the tines 16A, 16B into the guide slots 231 of the tine guide 230 may be due to the tine bar 211 coupling to the follower 240, which follows the cam 250. When the tines 16A, 16B are in the fourth position, the follower 240 may still be moving along the second cam surface 252. It should be appreciated that while the tines 16A, 16B are illustrated and described as pivoting into the guide slots 231 of the tine guide 230, in some embodiments the tine guide 230 is pivotable between various positions so the tine guide 230 pivots between positions where the tines 16A, 16B are inside the guide slots 231 or outside the guide slots 231. Further, in some embodiments the tine guide 230 is coupled to the reel 14, such as to a shaft 17 of the reel 14 that rotates the tine carriers 210, rather than to the tine carrier 210. In some embodiments the tine guide 230 may be coupled to the reel 14, such as to the tine bar 211 of the reel 14 that rotates the tine carrier(s) 210, rather than to the tine carrier 210. In some embodiments, the tine guide 230 may be coupled to the reel 14, such as to the follower 240 of the reel 14 that rotates the tine carrier 210, rather than to the tine carrier 210.

Figure 5:
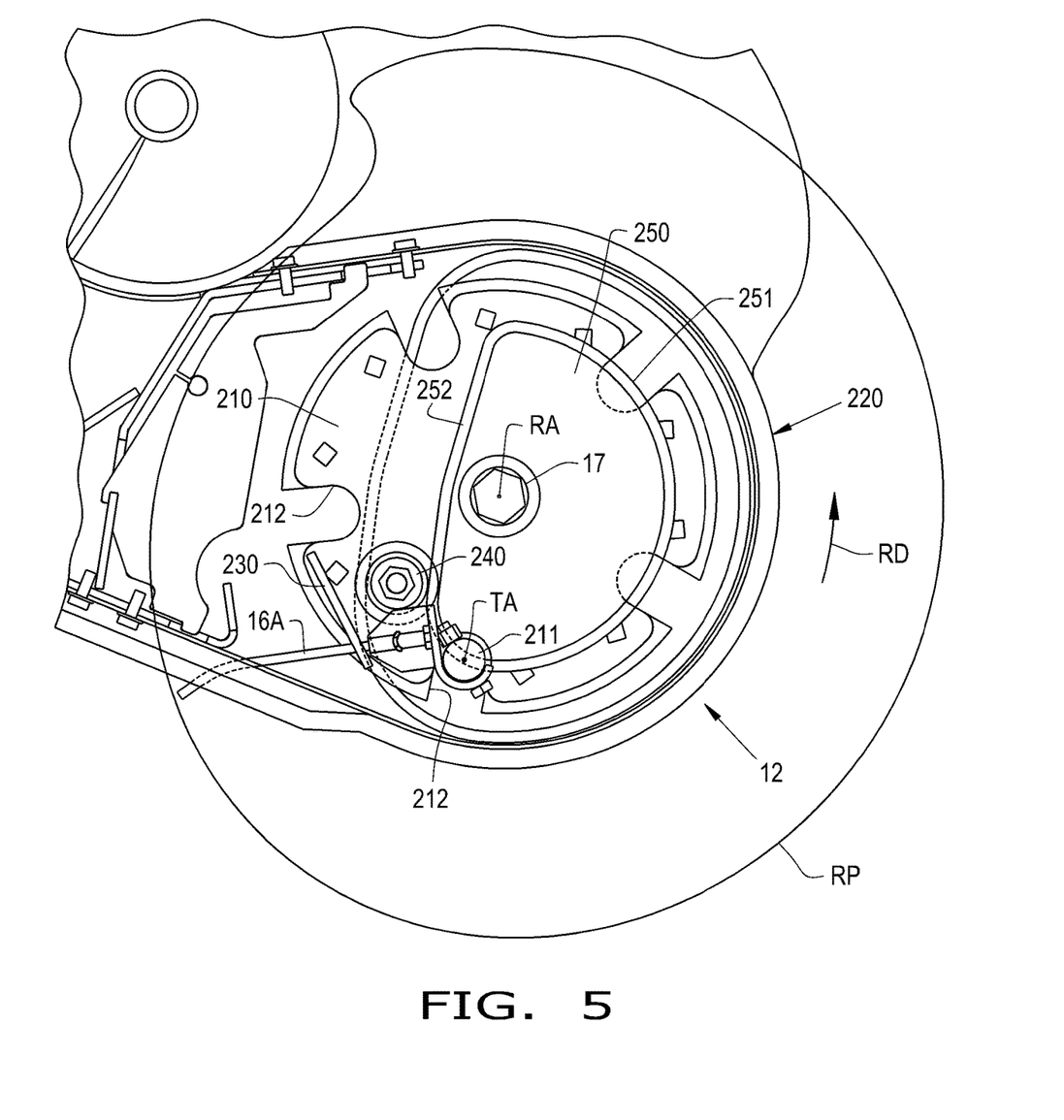
FIG. 5 illustrates a side view of the pickup of the baler of FIGS. 1-4 with the tines in a fifth position in their rotation path where the tines are traveling outside the guide slots of the tine guide and are disposed in a tine slot between pickup bands of the pickup band assembly, in accordance with an exemplary embodiment of the present invention.
Figure 11:
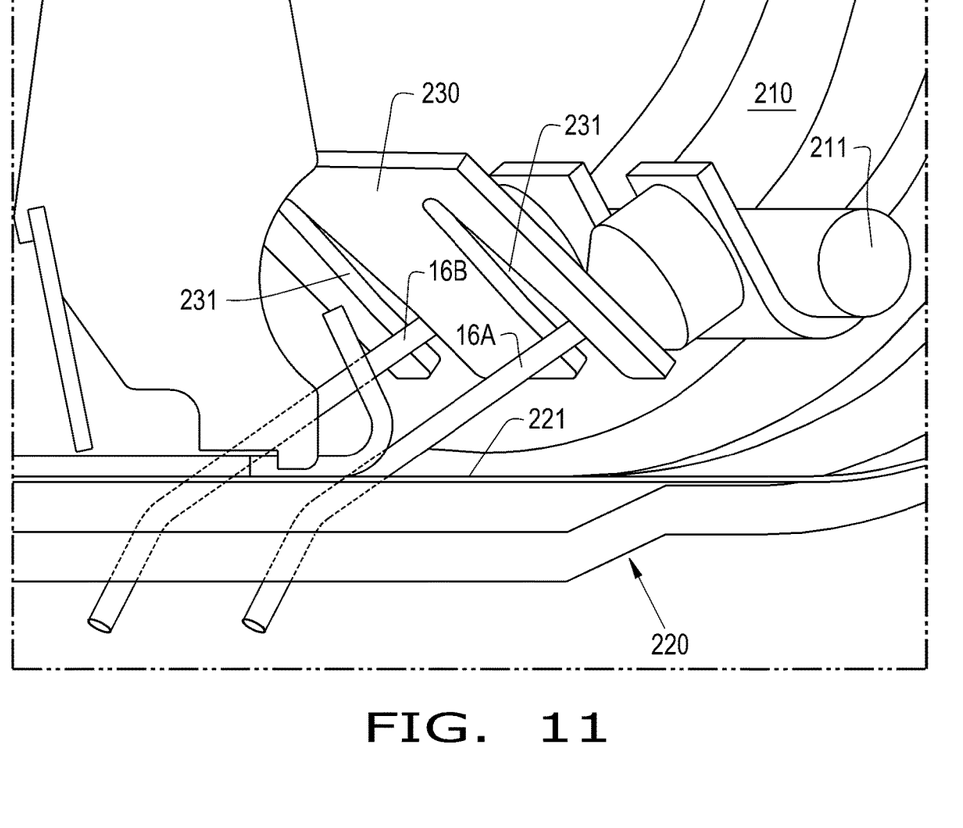
FIG. 11 illustrates a close-up perspective view of the pickup of the baler of FIGS. 1-5 and 7-10 when the tines are in the fifth position in their rotation path.

Referring now to FIGS. 5 and 11, the pickup 12 is illustrated after the tines 16A, 16B have been rotated to a fifth position in the rotation path RP by the tine carrier 210 and are transitioning from being disposed in the guide slots 231 of the tine guide 230 to solely being disposed in the tine slots 221 of the pickup band assembly 220. When the tines 16A, 16B are in the fifth position, the follower 240 may still be moving along the second cam surface 252 but approaching a transition to where the follower 240 moves along the first cam surface 251. When the follower 240 transitions from moving along the second cam surface 252 and moves along the first cam surface 251, the tines 16A, 16B further pivot to exit the guide slots 231 of the tine guide 230 and are disposed in the tine slots 221 of the pickup band assembly 220 but are no longer disposed in the guide slots 231, as previously described and illustrated in FIGS. 2 and 7. It should be appreciated that the tine carrier 210 defines a carrier rotation axis RA and the rotation path RP of the tines 16A, 16B carried by the tine carrier 210 may be a 360 degree rotation about the carrier rotation axis RA. However, it should be further appreciated that, in some embodiments, the rotation path RP of the tines 16A, 16B is less than a 360 degree rotation about the carrier rotation axis RA.

From the foregoing, it should be appreciated that the pickup 12 provided according to the present disclosure has a tine guide 230 that can reduce the risk of the tines 16, 16A, 16B excessively deflecting when the tines 16, 16A, 16B have moved out of the tine slots 221 of the pickup band assembly 220. The tine guide 230 may follow the tines 16, 16A, 16B by coupling to the tine carrier 210 that rotates the tines 16, 16A, 16B, ensuring that the tine guide 230 always rotates at the same rotational velocity as the reel 14. Further, there may be positions in the rotation path RP of the tines 16, 16A, 16B where the tines 16, 16A, 16B are not positioned in the guide slots 231 of the tine guide 230, but are positioned in the tine slots 221, to reduce the risk of the tines 16, 16A, 16B being too resistant to deflection when the tines 16, 16A, 16B are in a position to engage and carry crop material. Therefore, the pickup 12 provided according to the present disclosure is more resistant to the tines 16, 16A, 16B excessively deflecting when the tines 16, 16A, 16B are not supported by the pickup band assembly 220, reducing the risk of damage to the tines and associated problems, while also not excessively preventing deflection of the tines 16, 16A, 16B when more deflection may be beneficial, i.e., while the tines 16, 16A, 16B are carrying crop material.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A pickup for an agricultural vehicle, comprising:
a rotatable tine carrier;
a plurality of tines rotatably carried by the tine carrier through a rotation path;
a pickup band assembly comprising a plurality of tine slots in which the tines are disposed in a position in the rotation path; and
a tine guide comprising at least one guide slot, the tine guide being rotatable with at least one of the tines such that the at least one tine is disposed in the at least one guide slot in a position in the rotation path in which the at least one tine is outside any of the tine slots of the pickup band assembly, wherein the at least one tine is not disposed in the at least one guide slot in a position in the rotation path in which the at least one tine is disposed in one of the tine slots.

2. The pickup of claim 1, wherein the tines are coupled to the tine carrier by at least one tine bar.

3. The pickup of claim 2, further comprising a follower coupled to the at least one tine bar and a cam, the follower being configured to move along the cam to cause pivoting of the tines.

4. The pickup of claim 3, wherein the cam comprises a first cam surface and a second cam surface, the follower being configured to move along the first cam surface and the second cam surface to cause pivoting of the tines, wherein the at least one tine is disposed in one of the tine slots as the follower moves along the first cam surface and is disposed in the at least one guide slot as the follower moves along the second cam surface.

5. The pickup of claim 4, wherein the first cam surface is a curved surface and the second cam surface is a flat surface.

6. The pickup of claim 1, wherein the tine guide is carried by the tine carrier.

7. The pickup of claim 1, wherein the at least one guide slot comprises a plurality of guide slots, at least one of the tines being disposed in each of the guide slots in the position in the rotation path in which the at least one tine is outside any of the tine slots of the pickup band assembly.

8. The pickup of claim 1, wherein the tine carrier defines a carrier rotation axis and the rotation path is a 360 degree rotation about the carrier rotation axis.

9. The pickup of claim 1, wherein the pickup band assembly comprises a plurality of pickup bands coupled together and defining the tine slots therebetween.

10. An agricultural vehicle, comprising:
a chassis; and
a pickup carried by the chassis, the pickup comprising:
a rotatable tine carrier;
a plurality of tines rotatably carried by the tine carrier through a rotation path;
a pickup band assembly comprising a plurality of tine slots in which the tines are disposed in a position in the rotation path; and
a tine guide comprising at least one guide slot, the tine guide being rotatable with at least one of the tines such that the at least one tine is disposed in the at least one guide slot in a position in the rotation path in which the at least one tine is outside any of the tine slots of the pickup band assembly, and wherein the at least one tine is not disposed in the at least one guide slot in a position in the rotation path in which the at least one tine is disposed in one of the tine slots.

11. The agricultural vehicle of claim 10, wherein the tines are coupled to the tine carrier by at least one tine bar.

12. The agricultural vehicle of claim 11, further comprising a follower coupled to the at least one tine bar and a cam, the follower being configured to move along the cam to cause pivoting of the tines.

13. The agricultural vehicle of claim 12, wherein the cam comprises a first cam surface and a second cam surface, the follower being configured to move along the first cam surface and the second cam surface to cause pivoting of the tines, wherein the at least one tine is disposed in one of the tine slots as the follower moves along the first cam surface and is disposed in the at least one guide slot as the follower moves along the second cam surface.

14. The agricultural vehicle of claim 13, wherein the first cam surface is a curved surface and the second cam surface is a flat surface.

15. The agricultural vehicle of claim 10, wherein the tine guide is carried by the tine carrier.

16. The agricultural vehicle of claim 10, wherein the at least one guide slot comprises a plurality of guide slots, at least one of the tines being disposed in each of the guide slots in the position in the rotation path in which the at least one tine is outside any of the tine slots of the pickup band assembly.

17. The agricultural vehicle of claim 10, wherein the tine carrier defines a carrier rotation axis and the rotation path is a 360 degree rotation about the carrier rotation axis.

18. The agricultural vehicle of claim 10, further comprising a bale chamber configured to form a bale from crop material fed to the bale chamber by the pickup unit.

* * * * *